US009800038B2

(12) United States Patent
Noh et al.

(10) Patent No.: US 9,800,038 B2
(45) Date of Patent: Oct. 24, 2017

(54) WALL STRUCTURE AND LIGHTING SYSTEM USING THE SAME

(71) Applicant: FEELUX CO., LTD., Gyeonggi-do (KR)

(72) Inventors: Si Chung Noh, Gyeonggi-do (KR); Ha Young Jhun, Seoul (KR)

(73) Assignees: FEELUX CO., LTD., Gyeonggi-Do (KR); FEELUX LIGHTING, INC. GA (US)

( * ) Notice: Subject to any disclaimer, the term of this patent is extended or adjusted under 35 U.S.C. 154(b) by 282 days.

(21) Appl. No.: 14/700,098

(22) Filed: Apr. 29, 2015

(65) Prior Publication Data

US 2015/0311689 A1    Oct. 29, 2015

(30) Foreign Application Priority Data

Apr. 29, 2014 (KR) .................. 10-2014-0051199

(51) Int. Cl.
*H02G 3/30* (2006.01)
*H01F 38/14* (2006.01)
(Continued)

(52) U.S. Cl.
CPC ............. *H02G 3/305* (2013.01); *F21V 21/03* (2013.01); *F21V 21/096* (2013.01); *H01F 38/14* (2013.01);
(Continued)

(58) Field of Classification Search
CPC ........... H02G 3/305; H02G 3/00; H02J 50/10; F21V 21/03; F21V 21/096; F21V 23/003;
(Continued)

(56) References Cited

U.S. PATENT DOCUMENTS 7,513,777 B2    4/2009  Schneider et al.
7,784,965 B2 *  8/2010  Jiang .................. H05B 33/0803
                                                        362/158
(Continued)

FOREIGN PATENT DOCUMENTS

CN      101636616 A      1/2010
DE      3811740 A1      10/1989
(Continued)

OTHER PUBLICATIONS

Office action dated Feb. 17, 2015 from Korean Intellectual Property Office in a counterpart Korean Patent Application No. 10-2014-0051199.
(Continued)

*Primary Examiner* — Karl D Frech
(74) *Attorney, Agent, or Firm* — The PL Law Group, PLLC

(57) ABSTRACT

Disclosed are a wall structure and a lighting system using the same. The wall structure in accordance with one embodiment of the present invention includes an installation surface on which an electronic apparatus is installed; a first conductive attachment part provided at the installation surface to be attached to the electronic apparatus, and electrically connected with a first terminal of a power source configured to supply power to the electronic apparatus; and a second conductive attachment part provided at the installation surface to be attached to the electronic apparatus, spaced from the first conductive attachment part, and electrically connected with a second terminal of the power source configured to supply power to the electronic apparatus.

17 Claims, 11 Drawing Sheets

(51) Int. Cl.
*H02G 3/00* (2006.01)
*F21V 21/03* (2006.01)
*F21V 21/096* (2006.01)
*H02J 50/10* (2016.01)
*F21V 23/00* (2015.01)
*F21Y 103/10* (2016.01)
*F21Y 115/10* (2016.01)

(52) U.S. Cl.
CPC ............... *H02G 3/00* (2013.01); *H02J 50/10* (2016.02); *F21V 23/003* (2013.01); *F21Y 2103/10* (2016.08); *F21Y 2115/10* (2016.08)

(58) Field of Classification Search
CPC ... H01F 38/14; F21Y 2103/10; F21Y 2115/10
USPC .................. 362/192, 640, 158, 245, 189
See application file for complete search history.

(56) References Cited

U.S. PATENT DOCUMENTS

| | | | |
|---|---|---|---|
| 8,371,728 B2 | 2/2013 | Hente | |
| 2010/0170616 A1* | 7/2010 | Boss | ............... H01B 7/0815 156/71 |

FOREIGN PATENT DOCUMENTS

| | | |
|---|---|---|
| DE | 202006000425 U1 | 5/2007 |
| EP | 1799019 A1 | 6/2007 |
| EP | 1840454 A1 | 10/2007 |
| GB | 1032184 A | 6/1966 |
| JP | 2009-152138 A | 7/2009 |
| JP | 2009-288738 A | 12/2009 |
| KR | 20-2012-0008661 U | 12/2012 |
| KR | 10-2013-0103648 A | 9/2013 |
| WO | WO 2008/099306 A1 | 8/2008 |

OTHER PUBLICATIONS

Notice of Allowance dated Aug. 31, 2015 from Korean Intellectual Property Office in a counterpart Korean Patent Application No. 10-2014-0051199.
Office action dated Jan. 23, 2017 from Chinese Intellectual Property Office in a counterpart China Patent Application No. 201510131477.8.
European Search Report for EP15165517 from European patent office in a counterpart European patent application.

* cited by examiner

FIG. 9
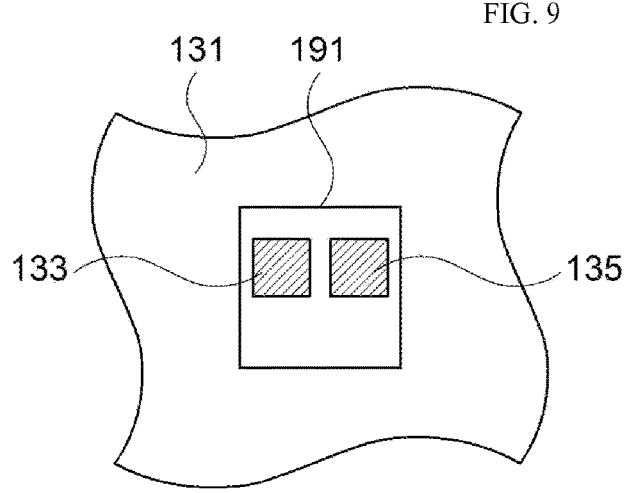
(a)
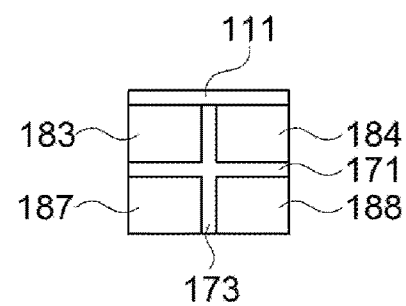
(b)

WALL STRUCTURE AND LIGHTING SYSTEM USING THE SAME

CROSS-REFERENCE TO RELATED APPLICATION

This application claims priority to and the benefit of Korean Patent Application No. 10-2014-0051199, filed on Apr. 29, 2014, the disclosure of which is incorporated herein by reference in its entirety.

BACKGROUND

1. Field of the Invention

The present invention relates to a power supplying technology, and more particularly, to a wall structure which supplies power to an electronic apparatus, and a lighting system using the same.

2. Discussion of Related Art

Generally, an electronic apparatus like a lighting apparatus has a power connection line or a power connection unit such as a power socket to receive power from an outside. In this case, since a volume of the electronic apparatus is increased, and a structure of the electronic apparatus is also complicated, a space capable of providing or installing the electronic apparatus is limited.

SUMMARY OF THE INVENTION

The present invention is directed to a wall structure which is capable of simplifying a structure related to power supply of an electronic apparatus, and also reducing a volume thereof, and a lighting system using the same.

Also, the present invention is directed to a wall structure which is capable of enhancing installability of an electronic apparatus, and also allowing the electronic apparatus to be installed at a position desired by a user, and a lighting system using the same.

According to an aspect of the present invention, there is provided a wall structure including an installation surface on which an electronic apparatus is installed; a first conductive attachment part provided at the installation surface to be attached to the electronic apparatus, and electrically connected with a first terminal of a power source configured to supply power to the electronic apparatus; and a second conductive attachment part provided at the installation surface to be attached to the electronic apparatus, spaced from the first conductive attachment part, and electrically connected with a second terminal of the power source.

The first and second conductive attachment parts may be conductive adhesive tapes of which one ends are adhered to the installation surface, and the other ends are adhered to the electronic apparatus.

The first and second conductive attachment parts may be insulating adhesive tapes of which one surfaces are adhered to the installation surface and the other surfaces are adhered to the electronic apparatus, and may include at least one via hole electrically connected with the power source at the one surfaces and electrically connected with the electronic apparatus at the other surfaces.

The first conductive attachment part may include a first conductive plate fixed to the installation surface, electrically connected with a first terminal of the power source, and in contact with the electronic apparatus, and a first magnetic body fixed to the installation surface and attached to the electronic apparatus, and the second conductive attachment part may include a first conductive plate fixed to the installation surface, electrically connected with a second terminal of the power source, and in contact with the electronic apparatus, and a second magnetic body fixed to the installation surface and attached to the electronic apparatus.

The first conductive attachment part and the second conductive attachment part may be magnetic bodies formed of a conductive material.

The wall structure may further include a third conductive attachment part provided at the installation surface to be attached to the electronic apparatus, electrically connected with a control device provided at an outside of the electronic apparatus, and configured to transfer a control signal generated in the control device to the electronic apparatus.

The electronic apparatus may be a lighting apparatus, and the third conductive attachment part may transfer at least one of a dimming signal and a digital multiplex (DMX) signal generated from the control device to the lighting apparatus.

The wall structure may further include an insertion groove provided at the installation surface so that a part or whole of the electronic apparatus is inserted therein, and the first and second conductive attachment parts may be provided in the insertion groove.

According to another aspect of the present invention, there is provided a wall structure including an installation surface on which an electronic apparatus is installed; an adhering member provided at the installation surface and attached to the electronic apparatus; a magnetic body provided at the installation surface; and a first coil provided at the magnetic body and electronically connected with a power source, wherein the first coil supplies power of the power source to the electronic apparatus through an electromagnetic inductive coupling.

The wall structure may further include a conductive attachment part provided at the installation surface to be attached to the electronic apparatus, electrically connected with a control device provided at an outside of the electronic apparatus, and configured to transfer a control signal generated in the control device to the electronic apparatus.

The electronic apparatus may be a lighting apparatus, and the conductive attachment part may transfer at least one of a dimming signal and a digital multiplex (DMX) signal generated in the control device to the lighting apparatus.

According to still another aspect of the present invention, there is provided a lighting system including a lighting apparatus; a first conductive attachment part provided at an installation surface, on which the lighting apparatus is installed, to be attached to the lighting apparatus, and electrically connected with a first terminal of a power source configured to supply power to the lighting apparatus; and a second conductive attachment part provided at the installation surface to be attached to the lighting apparatus, spaced from the first conductive attachment part, and electrically connected with a second terminal of the power source.

The lighting apparatus may include a light part and a housing part configured to accommodate the lighting part, and the housing part may include a first housing part attached to the first conductive attachment part, formed of a conductive material, and electrically connected with the lighting part; a second housing part attached to the second conductive attachment part, formed of the conductive material, and electrically connected with the lighting part; and an insulation part disposed between the first and second housing parts to insulate the first and second housing part from each other.

The lighting apparatus may further include a heat radiation part provided at at least one of the first and second housing parts.

The lighting apparatus may include a lighting part having a board on which at least one light emitting element is mounted and a housing part configured to accommodate the lighting part, and the housing part may include a first insulating plate provided in a lengthwise direction of the housing part; a second insulating plate provided in the lengthwise direction of the housing part to be orthogonal to the first insulating plate; and first to fourth housing parts disposed between the first and second insulating plates to be electrically insulated by the first and second insulating plates, and two of the first to fourth housing parts, on which the board is seated, may be attached to the first and second conductive attachment parts, respectively, and electrically connected with the board.

The lighting system may further include an insertion groove provided at the installation surface so that a part or all of the lighting apparatus is inserted therein, and the first and second conductive attachment parts may be provided in the insertion groove.

The first and second conductive attachment parts may be provided between an upper end of a panel and a ceiling on a wall surface on which the panel is installed, and the lighting apparatus may be attached to the first and second conductive attachment parts between the upper end of the panel and the ceiling.

According to yet another aspect of the present invention, there is provided a lighting system including a lighting apparatus; a magnetic body provided on an installation surface on which the lighting apparatus is installed; an adhering member provided on the installation surface and adhered to the lighting apparatus; and a first coil provided at the magnetic body and electrically connected with a power source, wherein the lighting apparatus includes a second coil coupled with the first coil through an electromagnetic inductive coupling, and configured to receive power of the power source through the electromagnetic inductive coupling.

The lighting apparatus may include a lighting part and a housing part configured to accommodate the lighting part, and the housing part may be attached to the installation surface by the adhering member, and the second coil may be provided in the housing part and electrically connected with the lighting part.

BRIEF DESCRIPTION OF THE DRAWINGS

The above and other objects, features and advantages of the present invention will become more apparent to those of ordinary skill in the art by describing in detail exemplary embodiments thereof with reference to the accompanying drawings, in which:

FIG. 9 is a view illustrating a state in which a first conductive attachment part and a second conductive attachment part are attached to the lighting apparatus in an insertion groove of FIG. 8;

DESCRIPTION OF REFERENCE NUMERALS

Figure 1:
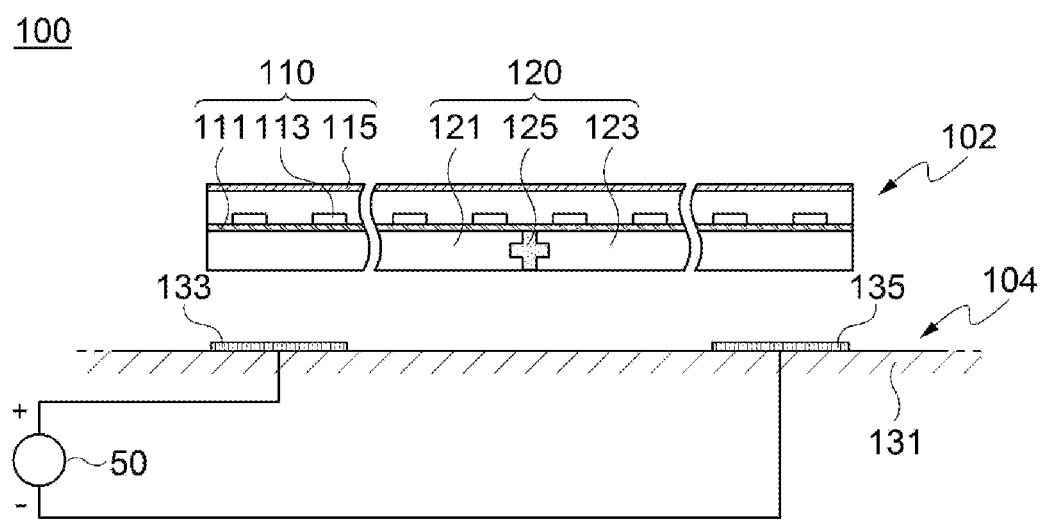
FIG. 1 is a view schematically illustrating a lighting system in accordance with one embodiment of the present invention.

100: lighting system
102: lighting apparatus
104: wall structure
110: lighting part
111: board
113: light emitting element
115: diffusion part
120: housing part
121: first housing part
122: coupling groove
123: second housing part
124: coupling protrusion
125: insulation part
126: heat radiation part
127: second coil
128: finishing member
131: installation surface
133: first conductive attachment part
133-1: first conductive plate
133-2: first magnetic body
135: second conductive attachment part
135-1: second conductive plate
135-2: second magnetic body
137: magnetic body
139: first coil
150: exhibition stand
151: shelf
155: panel
170: insulation part
171: first insulting plate
173: second insulating plate
173: third insulating plate
181: first housing part
182: second housing part
183: third housing part
184: fourth housing part
185: fifth housing part
186: sixth housing part
187: seventh housing part
188: eighth housing part
191: insertion groove

DETAILED DESCRIPTION OF EXEMPLARY EMBODIMENTS

Hereinafter, specific embodiments of a wall structure of the present invention and a lighting system using the same will be described with reference to FIGS. 1 to 11. However, the embodiments are merely to illustrate, and the present invention is not limited thereto.

In the following description, detailed descriptions of well-known functions or constructions will be omitted since they would obscure the invention in unnecessary detail. Also, the terms used herein are defined according to the functions of the present invention. Thus, the terms may vary depending on user's or operator's intentions or practices. Therefore, the terms used herein must be understood based on the descriptions made herein.

The technical spirit of the present invention is determined by the claims, and the following embodiments are provided to merely explain the technical spirit of the present invention to those skilled in the art to which the present invention pertains.

FIG. 1 is a view schematically illustrating a lighting system in accordance with one embodiment of the present invention.

Referring to FIG. 1, the lighting system 100 may include a lighting apparatus 102 and a wall structure 104.

The lighting apparatus 102 may be installed at the wall structure 104 to be electrically connected with the wall structure 104 and thus receive power from the wall structure 104. For convenience of explanation, FIG. 1 illustrates a cross-sectional view in a lengthwise direction of the lighting apparatus 102. The lighting apparatus 102 may include a lighting part 110 and a housing part 120.

The lighting part 110 may include a board 111, a light emitting element 113 and a diffusion part 115. The board 111 is a part on which the light emitting element 113 is installed, and serves to support mechanically the light emitting element 113. The board 111 may be formed in a bar shape having a predetermined length. However, a shape of the board 111 is not limited thereto. Various circuit patterns and electronic components for driving the light emitting element 113 may be provided on the board 111. For example, a first circuit pattern (not shown) for supplying the power to a first terminal of the light emitting element 113 and a second circuit pattern (not shown) for supplying the power to a second terminal of the light emitting element 113 may be provided on the board 111. The board 111 is electrically connected with the housing part 120 and receives the power for driving the light emitting element 113 from the housing part 120.

The light emitting element 113 is a device which converts electric energy into light energy and thus generates light. For example, the light emitting element 113 may be a light emitting diode (LED) or an organic light emitting diode (OLED). At least one light emitting element 113 is mounted on the board 111. A plurality of light emitting elements 113 may be arranged in a lengthwise direction of the board 111 to be spaced from each other. Each of the light emitting elements 113 have the first and second terminals (not shown) to which the power is supplied.

The diffusion part 115 is provided in a moving direction of light generated in the light emitting element 113. For example, the diffusion part 115 may be provided above the light emitting element 113. The diffusion part 115 serves to diffuse the light generated in the light emitting element 113 to an outside. Also, the diffusion part 115 may serve to protect the board 111 and the light emitting element 113 from an external environment.

The housing part 120 accommodates the lighting part 110 therein. That is, the board 111 may be installed and fixed in the housing part 120. The housing part 120 may include a first housing part 121, a second housing part 123, and an insulation part 125. Here, the insulation part 125 may be disposed between the first and second housing parts 121 and 123 and coupled with each of the first and second housing parts 121 and 123. The insulation part 125 serves to electrically insulate the first and second housing parts 121 and 123 from each other. The insulation part 125 may be provided in a width direction of the lighting apparatus 102 (i.e., in a direction perpendicular to a paper surface in FIG. 1) between the first and second housing parts 121 and 123. The first housing part 121 may be formed of a conductive material (e.g., aluminum, copper or the like). At this time, a part of the first housing part 121 may be formed of the conductive material. The first housing part 121 may be electrically connected to the first circuit pattern (not shown) (i.e., the circuit pattern for supplying the power to the first terminal of the light emitting element 113) provided on the board 111. The second housing part 123 may be formed of the conductive material (e.g., aluminum, copper or the like). At this time, a part of the second housing part 123 may be formed of the conductive material. The second housing part 123 may be electrically connected to the second circuit pattern (not shown) (i.e., the circuit pattern for supplying the power to the second terminal of the light emitting element 113) provided on the board 111.

The wall structure 104 has an installation surface 131 on which the lighting apparatus 102 is installed. For example, the wall structure 104 may be an indoor wall, floor and ceiling of a building, an outdoor wall of a building and so on. Also, the wall structure 104 may be, for example, furniture, an exhibition stand, a table, a decoration cabinet, a panel and so on. Furthermore, various structures having the installation surface 131 may be included.

A first conductive attachment part 133 and a second conductive attachment part 135 may be provided at the installation surface 131 of the wall structure 104. The second conductive attachment part 135 is provided to be spaced from the first conductive attachment part 133. The first conductive attachment part 133 may be electrically connected with a first terminal of a power source 50. The second conductive attachment part 135 may be electrically connected with a second terminal of the power source 50. The power source 50 may be provided in the wall structure 104, but is not limited thereto. The power source 50 may be provided at an outside of the wall structure 104. The power source 50 may be a commercial power source, but is not limited thereto. The power source 50 may be a separate power generating apparatus. The power source 50 serves to supply the power to the lighting apparatus 102 through the first and second conductive attachment parts 133 and 135. The power source 50 may autonomously generate the power and then may supply the power to the lighting apparatus 102, or may receive the power generated in an outside and then may supply the power to the lighting apparatus 102. When the power source 50 may be an AC power source, a converter (not shown) which converts AC power of the power source 50 into DC power may be provided between the power source 50 and the first and second conductive attachment parts 133 and 135.

The first and second conductive attachment parts 133 and 135 may be formed of a conductive adhesive tape. Each of the first and second conductive attachment parts 133 and 135 may be attached to the lighting apparatus 102, and may serve to fix the lighting apparatus 102 to the installation surface 131 and to supply the power to the lighting apparatus 102. One surface of each first and second conductive attachment part 133 and 135 is adhered and fixed to the installation surface 131. The other surface of the first conductive attachment part 133 may be adhered to the first housing part 121. The other surface of the second conductive attachment part 135 may be adhered to the second housing part 123.

Here, it has been described that the first and second conductive attachment parts 133 and 135 were formed of the conductive adhesive tape. However, the present invention is not limited thereto. The first and second conductive attachment parts 133 and 135 may be formed of an insulating adhesive tape. That is, the first and second conductive attachment parts 133 and 135 may be formed of an adhesive tape of which one surface is adhered to the installation surface 131 and the other surface is adhered to the lighting apparatus 102. At this time, the insulating adhesive tape may have at least one via hole of which one surface is electrically connected with the power source 50, and the other surface is electrically connected with the lighting apparatus 102. Also, the first and second conductive attachment parts 133 and 135 may be formed of a magnetic body made of a conductive material.

To examine a power supplying route from the power source 50 to the light emitting element 113, the power is supplied in order the first terminal of the power source 50→the first conductive attachment part 133→the first housing part 121→the first circuit pattern (not shown) of the board 111→the first terminal of the light emitting element 113, and also supplied through the second terminal of the power source 50→the second conductive attachment part 135→the second housing part 123→the second circuit pattern (not shown) of the board 111→the second terminal of the light emitting element 113.

According to the embodiment of the present invention, since the lighting apparatus 102 is attached and fixed to the wall structure 104, and thus a separate installing member for installing the lighting apparatus 102 is not required, a volume of the lighting apparatus 102 may be reduced, and the lighting apparatus 102 may be easily installed. In addition, the lighting apparatus may be installed at various places and spaces without limitation of an installation place of the lighting apparatus 102. Since the lighting apparatus 102 receives the power from the first and second conductive attachment parts 133 and 135 provided at the installation surface 131, a separate connection device for power supply is not required, and thus a structure of the lighting apparatus 102 may be simplified, while the volume thereof is reduced.

Meanwhile, it has been described herein that the first and second conductive attachment parts 133 and 135 for supplying the power to the lighting apparatus 102 were provided at the installation surface 131. However, the present invention is not limited thereto. A conductive attachment part which is electrically connected with a control device (not shown) for controlling the lighting apparatus 102 and transfers a lighting control signal (e.g., a dimming signal or a digital multiplex (DMX) signal) generated in the control device (not shown) to the lighting apparatus 102 may be provided at the installation surface 131. At least one of a conductive attachment part for supplying the power to the lighting apparatus 102 and a conductive attachment part for transferring the lighting control signal to the lighting apparatus 102 may be provided at the installation surface 131. Also, it has been described herein that the wall structure 104 supplied the power to the lighting apparatus 102. However, the present invention is not limited thereto, and the wall structure 104 may supply the power to various electronic apparatuses in addition to the lighting apparatus 102.

Figure 2:
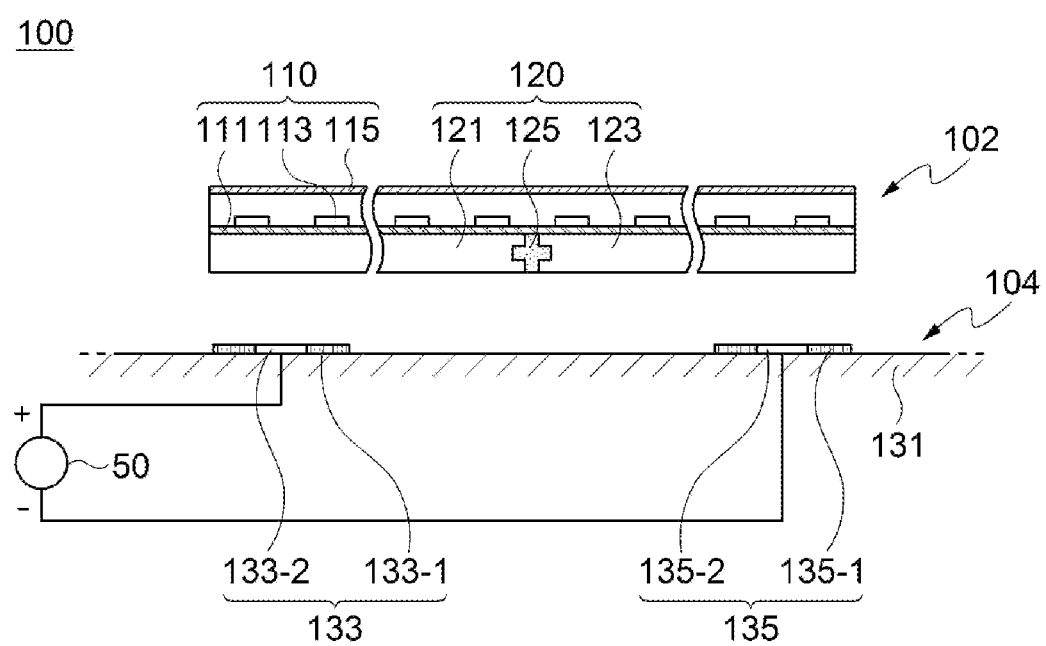
FIG. 2 is a view schematically illustrating a lighting system in accordance with another embodiment of the present invention.

FIG. 2 is a view schematically illustrating a lighting system in accordance with another embodiment of the present invention. Here, portions which are different from those of the embodiment illustrated in FIG. 1 will be mainly described.

Referring to FIG. 2, the first conductive attachment part 133 may include a first conductive plate 133-1 and a first magnetic body 133-2. The second conductive attachment part 135 may include a second conductive plate 135-1 and a second magnetic body 135-2. The first and second conductive plates 133-1 and 135-1 serve to electrically connect the lighting apparatus 102 with the power source 50. The first and second magnetic bodies 133-2 and 135-2 serve to fix the lighting apparatus 102 to the installation surface 131.

The first and second conductive plates 133-1 and 135-1 may be formed of a conductive material (e.g., a metal such as copper, silver, aluminum or the like). The first and second conductive plates 133-1 and 135-1 are fixed to the installation surface 131 to be spaced from each other. The first conductive plate 133-1 is electrically connected to the first terminal of the power source 50, and is in contact with the first housing part 121, and thus serves to transmit the power of the power source 50 to the first housing part 121. The second conductive plate 153-1 is electrically connected to the second terminal of the power source 50, and is in contact with the second housing part 123, and thus serves to transmit the power of the power source 50 to the second housing part 123.

The first and second magnetic bodies 133-2 and 135-2 may be respectively fixed to the installation surface 131 at inner sides of the first and second conductive plates 133-1 and 135-1. However, the present is not limited thereto, and the first and second magnetic bodies 133-2 and 135-2 may be respectively fixed to the installation surface 131 at outer sides of the first and second conductive plates 133-1 and 135-1. When the lighting apparatus 102 is installed on the installation surface 131, the first housing part 121 may be attached to the first magnetic body 133-2, and the second housing part 123 may be attached to the second magnetic body 135-2. At this time, the first and second magnetic bodies 133-2 and 135-2 serve to fix the lighting apparatus 102 to the installation surface 131.

Figure 3:
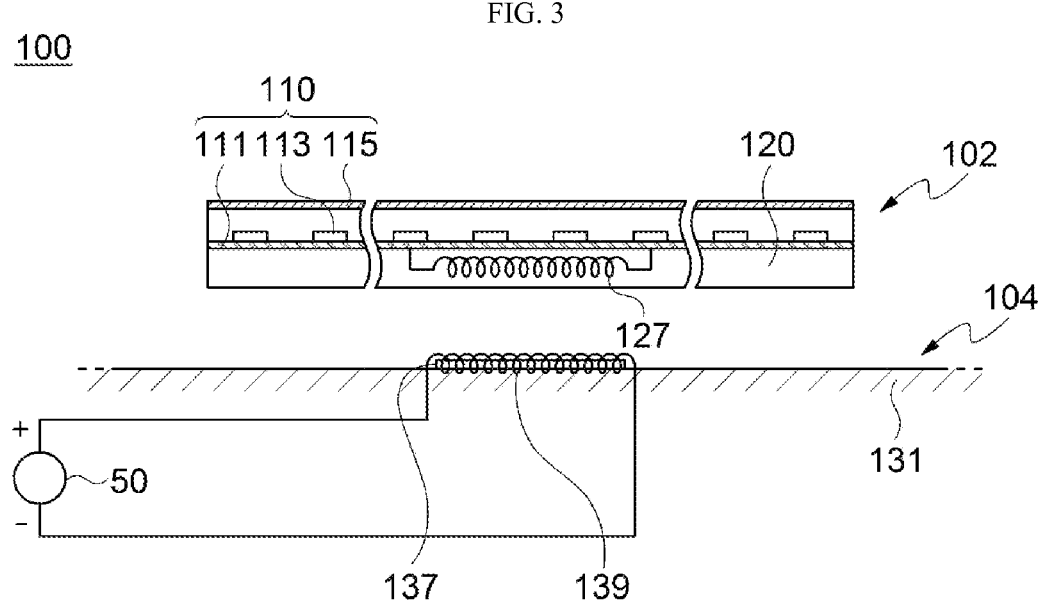
FIG. 3 is a view schematically illustrating a lighting system in accordance with still another embodiment of the present invention.

FIG. 3 is a view schematically illustrating a lighting system in accordance with still another embodiment of the present invention. Here, portions which are different from those of the embodiment illustrated in FIG. 1 will be mainly described.

Referring to FIG. 3, a magnetic body 137 may be provided at the installation surface 131, and a first coil 139 may be wound on the magnetic body 137. The magnetic body 137 may be buried in the installation surface 131 so that one surface thereof (facing the lighting apparatus 102) is exposed to an outside. However, the present invention is not limited thereto, and the magnetic body 137 may be provided to be fixed on the installation surface 131. Both ends of the first coil 139 are electrically connected with the first and second terminals of the power source 50. A fixing member (not shown) such as an adhesive tape may be provided at the installation surface 131 to fix the lighting apparatus 102 to the installation surface 131.

Meanwhile, the lighting apparatus 102 may have the housing part 120 integrally formed therewith. The housing part 120 may be formed of a non-conductive material. A second coil 127 may be provided in the housing part 120. One end of the second coil 127 may be electrically connected with the first circuit pattern (not shown) of the board 111, and the other end thereof may be electrically connected with the second circuit pattern (not shown) of the board 111. The second coil 127 is electrically coupled with the first coil 139 to supply the power to the light emitting element 113.

When the lighting apparatus 102 is installed on the installation surface 131, and the AC power is generated in the power source 50, in the first coil 139, a magnetic field is changed according to a change in polarity of the AC power. Then, a current is induced and flows through the second coil 127 due to the principle of electromagnetic conduction, and the power is supplied to the light emitting element 113 through the board 111.

Figure 4:
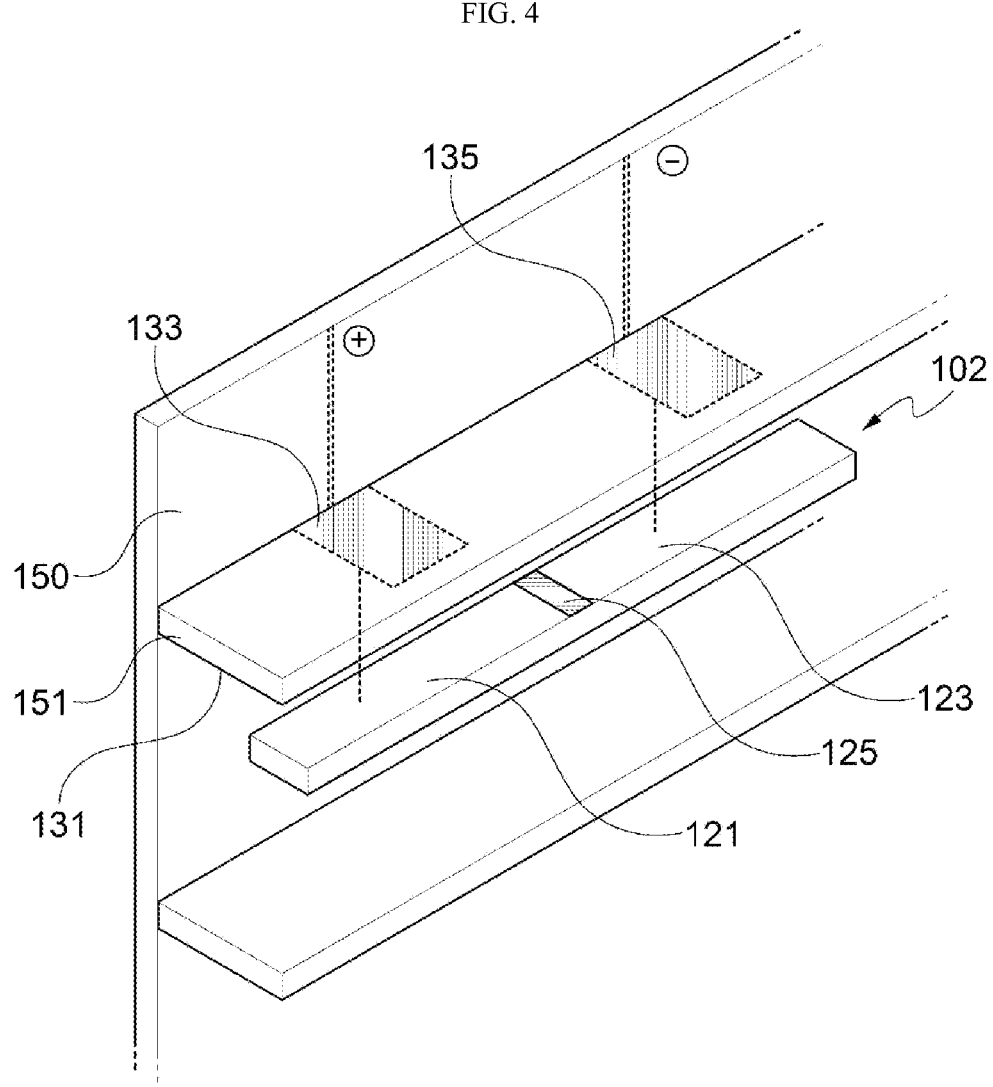
FIG. 4 is a view illustrating a state in which a lighting system in accordance with one embodiment of the present invention is installed at an exhibition stand.

FIG. 4 is a view illustrating a state in which a lighting system in accordance with one embodiment of the present invention is installed at an exhibition stand.

Referring to FIG. 4, a plurality of shelves for displaying articles may be provided at the exhibition stand 150. At this time, a lower surface of each shelf 151 may serves as the installation surface 131. The first and second conductive attachment parts 133 and 135 may be provided on the installation surface 131 to be spaced from each other. The first conductive attachment part 133 may be electrically connected with the first terminal of the power source (not shown), and the second conductive attachment part 135 may be electrically connected with the second terminal of the power source (not shown). The lighting apparatus 102 may be attached and fixed to the lower surface (i.e., the installation surface 131) of the shelf 151. The first housing part 121 may be attached to the first conductive attachment part 133, and the second housing part 123 may be attached to the second conductive attachment part 135. The lighting apparatus 102 receives the power from the first and second conductive attachment parts 133 and 135.

Figure 5:
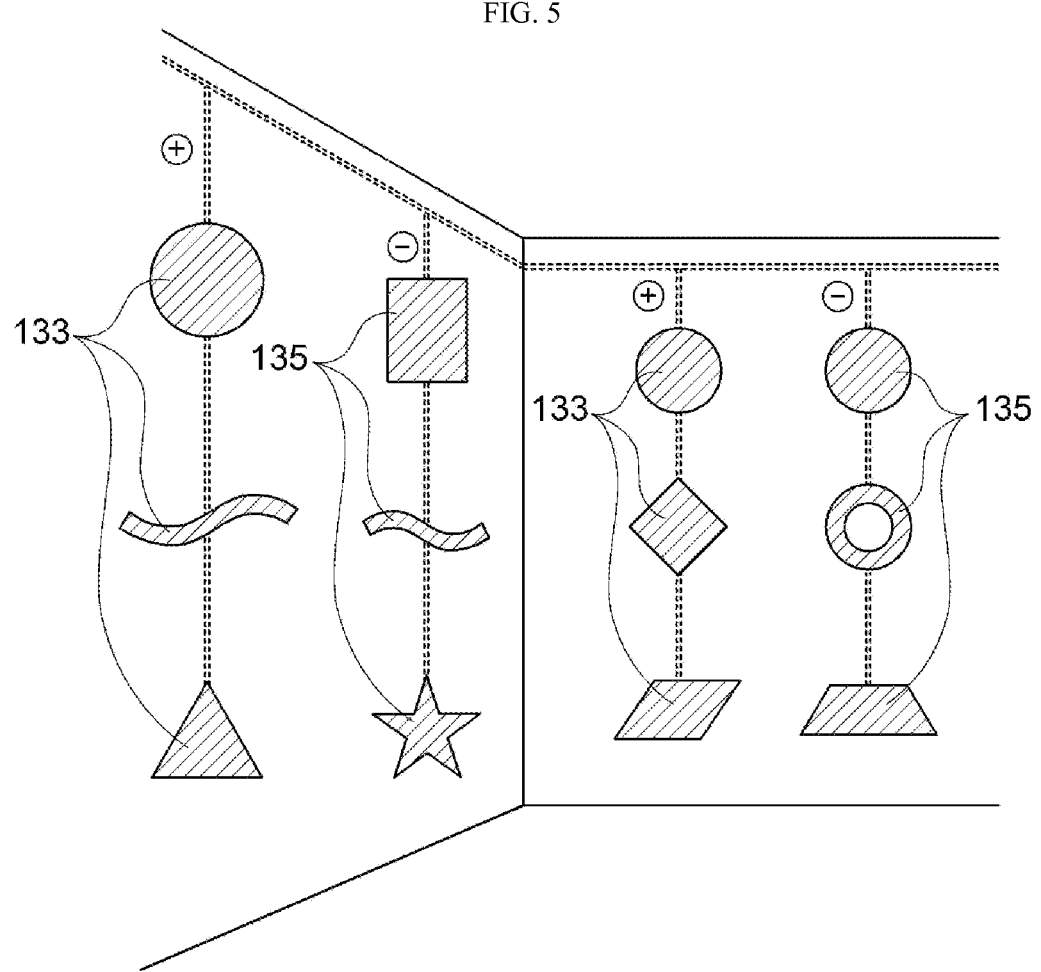
FIG. 5 is a view illustrating a state in which a conductive attachment part is formed at the wall structure in accordance with one embodiment of the present invention.

FIG. 5 is a view illustrating a state in which the conductive attachment part is formed at the wall structure in accordance with one embodiment of the present invention.

Referring to FIG. 5, at least one first conductive attachment part 133 and at least one second conductive attachment part 135 may be provided at a wall surface. The at least one first conductive attachment part 133 may be electrically connected with the first terminal of the power source (not shown). The at least one second conductive attachment part 135 may be electrically connected with the second terminal of the power source (not shown). The first and second conductive attachment parts 133 and 135 may be formed in a figure shape (e.g., a circular shape, a square shape, a triangular shape, a star shape, an annular shape or the like), but are not limited thereto. The first and second conductive attachment parts 133 and 135 may be formed in various shapes such as a symbol, a character, a figure and a combination thereof. In this case, the lighting apparatus 102 has only to be attached to a portion in which the first and second conductive attachment parts 133 and 135 are provided, and thus the lighting apparatus 102 may be easily installed at a place desired by a user.

Figure 6:
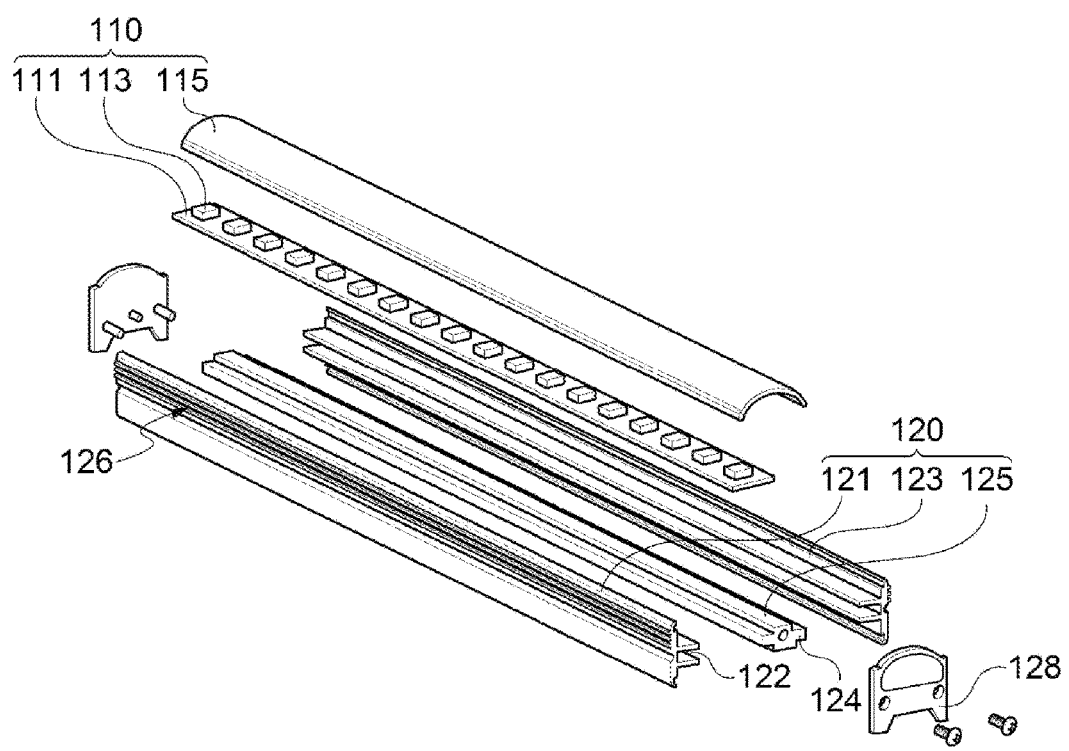
FIG. 6 is an exploded perspective view illustrating a lighting apparatus in accordance with one embodiment of the present invention.

FIG. 6 is an exploded perspective view illustrating a lighting apparatus in accordance with another embodiment of the present invention.

Referring to FIG. 6, the lighting apparatus 102 may include a lighting part 110 and a housing part 120. The lighting part 110 may include a board 111, a light emitting element 113, and a diffusion part 115. Here, since the lighting part 110 is the same as that described with reference to FIG. 1, the detailed description thereof will be omitted.

The housing part 120 may include a first housing part 121, a second housing part 123, and an insulation part 125. Here, the insulation part 125 may be disposed between the first and second housing parts 121 and 123 and coupled with each of the first and second housing parts 121 and 123. The first and second housing parts 121 and 123 are formed to face each other with the insulation part 125 disposed therebetween. A coupling groove 122 may be formed at each of the first and second housing parts 121 and 123 in a lengthwise direction thereof. A coupling protrusion 124 may be formed at both sides of the insulation part 125 in a lengthwise direction of the insulation part 125. At this time, the coupling protrusions 124 formed at both sides of the insulation part 125 may be inserted and coupled into the coupling grooves 122 of the first and second housing parts 121 and 123. However, a coupling method between the first and second housing parts 121 and 123 and the insulation part 125 is not limited thereto. The insulation part 125 is provided between the first and second housing parts 121 and 123 in a lengthwise direction of the lighting apparatus 102 so as to electrically insulate the first and second housing parts 121 and 123 from each other. For reference, FIG. 1 illustrates the case in which the insulation part 125 is provided in the width direction of the lighting apparatus 102 so as to electrically insulate the first and second housing parts 121 and 123 from each other.

A heat radiation part 126 which is formed in an uneven shape to increase a contact area with air may be provided at outer surfaces of the first and second housing parts 121 and 123. The heat radiation part 126 serves to radiate heat generated in the lighting part 110. A finishing member 128 may be coupled to both ends of the first and second housing parts 121 and 123. The diffusion part 115 may be slidably coupled to upper ends of the first and second housing parts 121 and 123.

Figure 7:
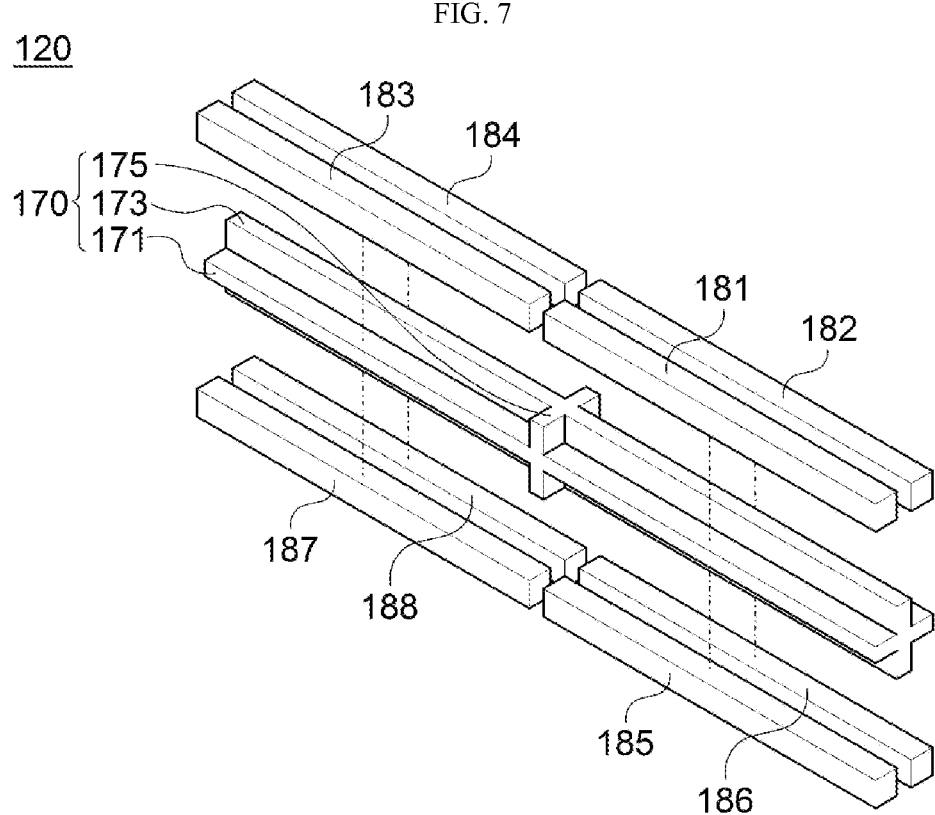
FIG. 7 is a view schematically illustrating another example of a housing part in the lighting apparatus in accordance with the embodiment of the present invention.

FIG. 7 is a view schematically illustrating another example of a housing part in the lighting apparatus in accordance with the embodiment of the present invention.

Referring to FIG. 7, the housing part 120 may include an insulation part 170 and first to eighth housing parts 181 to 188. The insulation part 170 may include a first insulating plate 171, a second insulating plate 173 and a third insulating plate 175. The first insulating plate 171 may be horizontally disposed in a lengthwise direction of the housing part 120. The second insulating plate 173 may be provided to be orthogonal to the first insulating plate 171. The second insulating plate 173 may be provided to be orthogonal to the first insulating plate 171 in a lengthwise direction of the first insulating plate 171. The third insulating plate 175 may be provided to be orthogonal to each of the first insulating plate 171 and the second insulating plate 173. The third insulating plate 175 may be provided to be orthogonal to each of the first insulating plate 171 and the second insulating plate 173 in a width direction of each of the first insulating plate 171 and the second insulating plate 173. In this case, the first insulating plate 171 is partitioned into eight seating surfaces. That is, an upper surface of the first insulating plate 171 is partitioned into four seating surfaces, and a lower surface of the first insulating plate 171 is partitioned into four seating surfaces. The first to fourth housing parts 181 to 184 may be seated on the four seating surfaces partitioned on the upper surface of the first insulating plate 171, and the fifth to eighth housing parts 185 to 188 may be seated on the four seating surfaces partitioned on the lower surface of the first insulating plate 171. The insulation part 170 is disposed among the first to eighth housing parts 181 to 188 so as to electrically insulate the first to eighth housing parts 181 to 188 from each other. The board (not shown) of the lighting part (not shown) may be seated on the first to fourth housing parts 181 to 184.

Here, the first housing part 181 and the second housing part 182 (or the third housing part 183 and the fourth housing part 184) may be electrically connected with the board (not shown) and attached to the first and second conductive attachment parts so as to receive the power. Meanwhile, the insulation part 170 may include the first and second insulating plates 171 and 173 without the third insulating plate 175. In this case, the first insulating plate 171 is partitioned into a total of four seating surfaces.

Figure 8:
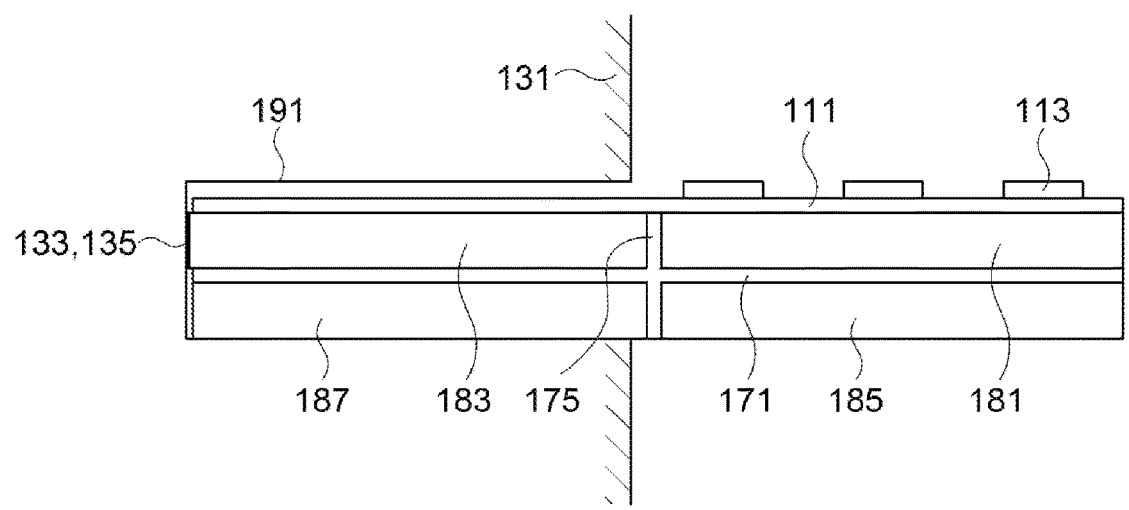
FIG. 8 is a cross-sectional view schematically illustrating a state in which the lighting apparatus including the housing part illustrated in FIG. 7 is installed at the wall structure.

FIG. 8 is a cross-sectional view schematically illustrating a state in which the lighting apparatus including the housing part illustrated in FIG. 7 is installed at the wall structure.

Referring to FIG. 8, an insertion groove 191 in which a part of the lighting apparatus 102 is inserted may be provided at the installation surface 131. The part of the lighting apparatus 102 may be inserted into the insertion groove 191 in a lengthwise direction thereof. The light emitting elements 113 may be installed on a portion of the board 111 of the lighting apparatus 102 other than a portion thereof in which the lighting apparatus 102 is inserted. The first and second conductive attachment parts 133 and 135 may be provided on a surface of the insertion groove 191 facing one end of the lighting apparatus 102. The first conductive attachment part 133 may be electrically connected with the first terminal of the power source (not shown), and the second conductive attachment part 135 may be electrically connected with the second terminal of the power source (not shown).

FIG. 9 is a view illustrating a state in which the first conductive attachment part 133 and the second conductive attachment part 135 are attached to the lighting apparatus 102 in the insertion groove of FIG. 8. FIG. 9A is a front view of the insertion groove 191, and FIG. 9B is a front view of one end of the lighting apparatus 102. Referring to FIG. 9, the first and second conductive attachment parts 133 and 135 may be provided at upper sides of one surface of the insertion groove 191 facing one end of the lighting apparatus 102 so as to be spaced from each other. The third and fourth housing parts 183 and 184 of the lighting apparatus 102 may be electrically connected with the board 111. One ends of the third and fourth housing parts 183 and 184 may be attached to the first and second conductive attachment parts 133 and 135, respectively. In this case, the lighting apparatus 102 may be fixed in the insertion groove 191, and may receive the power of the power source (not shown) from the first and second conductive attachment parts 133 and 135.

Figure 10:
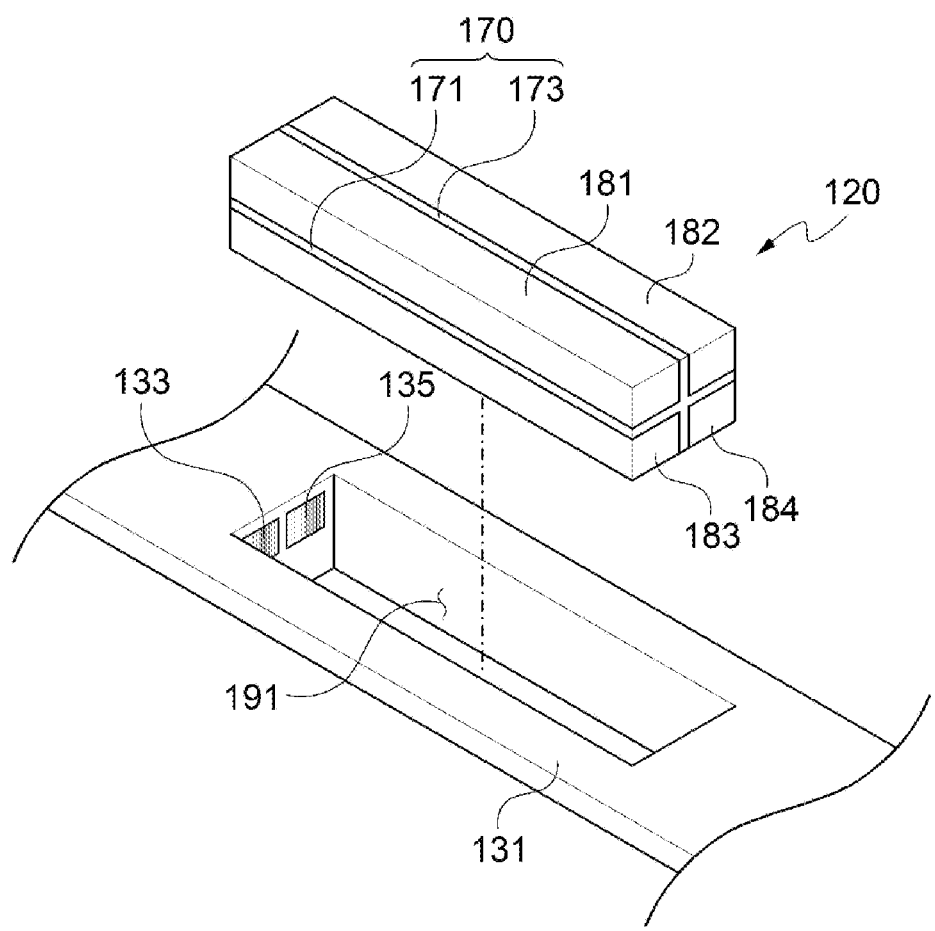
FIG. 10 is a view schematically illustrating a state in which the lighting apparatus including a housing part in accordance with still another embodiment of the present invention is installed at the wall structure.

FIG. 10 is a view schematically illustrating a state in which the lighting apparatus including a housing part in accordance with still another embodiment of the present invention is installed at the wall structure.

Referring to FIG. 10, the housing part 120 may include an insulation part 170, and first to fourth housing parts 181 to 184. The insulation part 170 may include a first insulating plate 171 which is provided in a lengthwise direction of the housing part 120, and a second insulating plate 173 which is provided in the lengthwise direction of the housing part 120 to be orthogonal to the first insulating plate 171. The first and second housing parts 181 and 182 may be provided on an upper surface of the first insulating plate 171 with the second insulating plate 173 disposed therebetween. The third and fourth housing parts 183 and 184 may be provided on a lower surface of the first insulating plate 171 with the second insulating plate 173 disposed therebetween. The board (not shown) of the lighting part (not shown) may be seated on the first and second housing parts 181 and 182. The first and second housing parts 181 and 182 may be electrically connected with first and second circuit patterns of the board (not shown), respectively.

An insertion groove 191 in which the lighting apparatus 102 is inserted may be provided at the installation surface 131 of the wall structure 104. For example, the insertion groove 191 is provided at the installation surface 131 such as an indoor wall surface, a table, a bookshelf, a decoration cabinet, and an exhibition stand, and the lighting apparatus 102 may be inserted therein. The insertion groove 191 may be provided to have a size corresponding to the lighting apparatus 102. When the lighting apparatus 102 is inserted into the insertion groove 191, the lighting apparatus 102 may be integrally provided at the wall structure 104 not to protrude from the installation surface 131. In this case, an exterior of the wall structure 104 may be enhanced, and a lighting effect may be obtained through the lighting apparatus 102.

The first and second conductive attachment parts 133 and 135 may be provided at a surface of the insertion groove 191 facing one end of the lighting apparatus 102 so as to be spaced from each other. The first and second conductive attachment parts 133 and 135 may be electrically connected with the first and second terminals of the power source 50, respectively. When the lighting apparatus 102 is inserted into the insertion groove 191, one end of the first housing part 181 may be attached to the first conductive attachment part 133, and one end of the second housing part 182 may be attached to the second conductive attachment part 135. Then, the lighting apparatus 102 receives the power of the power source 50 through the first and second conductive attachment parts 133 and 135.

Figure 11A:
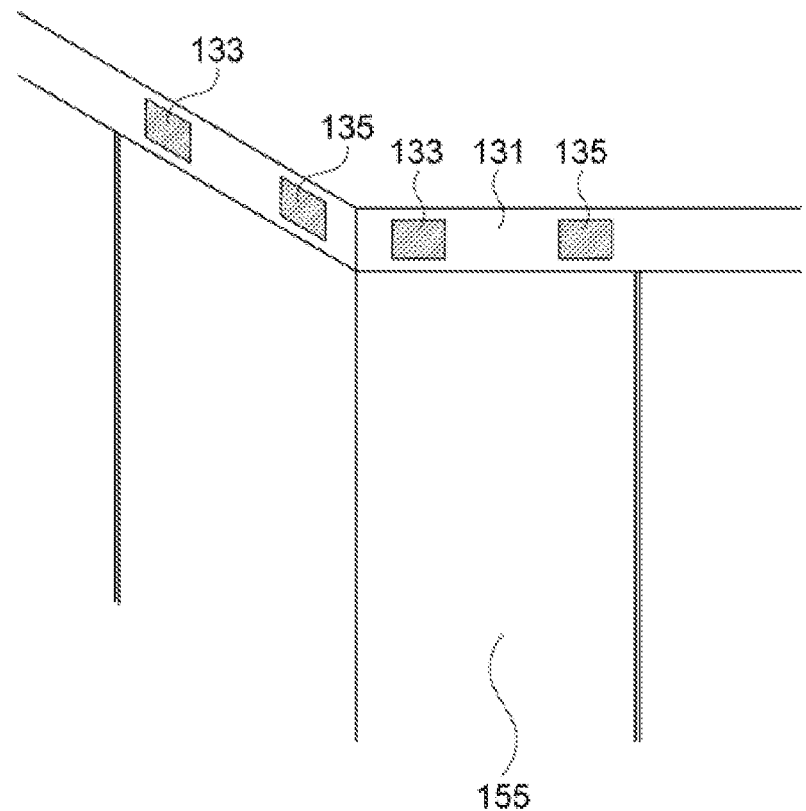
FIGS. 11A and 11B are views illustrating another example in which the lighting apparatus in accordance with the embodiment of the present invention is installed at the wall structure.
Figure 11B:
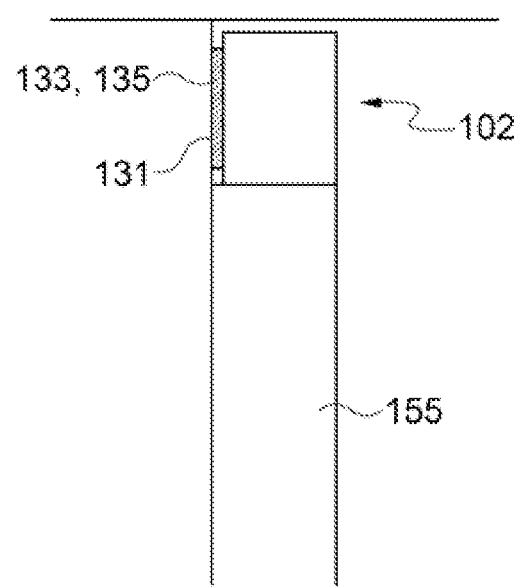

FIGS. 11A and 11B are views illustrating another example in which the lighting apparatus in accordance with the embodiment of the present invention is installed at the wall structure.

Referring to FIG. 11A, panels 155 may be installed on the wall surface 131. The panels 155 may be spaced predetermined distances from a ceiling. The first and second conductive attachment parts 133 and 135 may be provided at an upper side of the wall surface 131 on which the panels 155 are not provided.

FIG. 11B is a cross-sectional view illustrating a state in which the lighting apparatus 102 is installed at the wall surface 131. Referring to FIG. 11B, the lighting apparatus 102 may be attached to the first and second conductive attachment parts 133 and 135 to receive the power through the first and second conductive attachment parts 133 and 135. The lighting apparatus 102 may be provided not to protrude from a front surface of each panel 155. At this time, the lighting apparatus 102 may provided to be integrally formed with the panel 155. In this case, an entire exterior may be finished to be enhanced using the lighting apparatus 102 as a finishing member. The lighting apparatus 102 may be provided along upper sides of the wall surface 131.

According to the embodiment of the present invention, since the electronic apparatus is attached and fixed to the wall structure, a separate installing member for installing the electronic apparatus is not required, and thus a volume of the electronic apparatus can be reduced, and the electronic apparatus can be easily and simply installed. In addition, the electronic apparatus can be installed at various places and spaces without limitation of an installation place of the lighting apparatus. And since the electronic apparatus receives the power from the first and second conductive attachment parts provided at the installation surface, a separate connection device for power supply is not required, and thus a structure of the electronic apparatus can be simplified, while the volume thereof is reduced.

It will be apparent to those skilled in the art that various modifications can be made to the above-described exemplary embodiments of the present invention without departing from the spirit or scope of the invention. Thus, it is intended that the present invention covers all such modifications provided they come within the scope of the appended claims and their equivalents.

What is claimed is:

1. A lighting system comprising:
an installation surface;
first conductive attachment part provided at the installation surface, and electrically connected with a first terminal of a power source;
a second conductive attachment part provided at the installation surface, spaced from the first conductive attachment part, and electrically connected with a second terminal of the power source,
a lighting apparatus installed on the installation surface, the lighting apparatus comprising:
a lighting part; and
a housing part to accommodate the lighting part, the housing part comprising:
a first housing part attached to the first conductive attachment part, formed of a conductive material, and electrically connected with the lighting part;
a second housing part attached to the second conductive attachment part, formed of the conductive material, and electrically connected with the lighting part; and
an insulation part disposed between the first and second housing parts to insulate the first and second housing part from each other.

2. The lighting system of claim 1, wherein the first and second conductive attachment parts are conductive adhesive tapes of which one ends are adhered to the installation surface and the other ends are adhered to the lighting apparatus.

3. The lighting system of claim 1, wherein the first and second conductive attachment parts are insulating adhesive tapes of which one surfaces are adhered to the installation surface and the other surfaces are adhered to the lighting apparatus, and comprise at least one via hole electrically connected with the power source at the one surfaces and electrically connected with the lighting apparatus at the other surfaces.

4. The lighting system of claim 1, wherein the first conductive attachment part comprises a first conductive plate fixed to the installation surface, electrically connected with the first terminal of the power source, and in contact with the lighting apparatus, and a first magnetic body fixed to the installation surface and attached to the lighting apparatus, and
the second conductive attachment part comprises a second conductive plate fixed to the installation surface, electrically connected with the second terminal of the power source, and in contact with the lighting apparatus, and a second magnetic body fixed to the installation surface and attached to the lighting apparatus.

5. The lighting system of claim 1, wherein the first conductive attachment part and the second conductive attachment part are magnetic bodies formed of a conductive material.

6. The lighting system of claim 1, further comprising a third conductive attachment part provided at the installation surface to be attached to the lighting apparatus, electrically connected with a control device provided at an outside of the lighting apparatus, and configured to transfer a control signal generated in the control device to the lighting apparatus.

7. The lighting system of claim 6, wherein the third conductive attachment part transfers at least one of a dimming signal and a digital multiplex (DMX) signal generated from the control device to the lighting apparatus.

8. The lighting system of claim 1, further comprising an insertion groove provided at the installation surface so that a part or all of the lighting apparatus is inserted therein,
wherein the first and second conductive attachment parts are provided in the insertion groove.

9. The lighting system of claim 1, wherein the lighting apparatus further comprises a heat radiation part provided at at least one of the first and second housing parts.

10. The lighting system of claim 1, wherein the first and second conductive attachment parts are provided between an upper end of a panel and a ceiling on a wall surface on which the panel is installed, and the lighting apparatus is attached to the first and second conductive attachment parts between the upper end of the panel and the ceiling.

11. A lighting system comprising:
an installation surface;
a magnetic body provided at the installation surface;
a first coil provided at the magnetic body and electronically connected with a power source; and
a lighting apparatus installed on the installation surface and receiving power of the power source supplied from the first coil through an electromagnetic inductive coupling, the lighting apparatus comprising:
a lighting part; and
a housing part to accommodate the lighting part, the housing part comprising:
a first housing part formed of a conductive material, and electrically connected with the lighting part;
a second housing part formed of the conductive material, and electrically connected with the lighting part; and
an insulation part disposed between the first and second housing parts to insulate the first and second housing parts from each other.

12. The lighting system of claim 11, further comprising a conductive attachment part provided at the installation surface to be attached to the lighting apparatus, electrically connected with a control device provided at an outside of the lighting apparatus, and configured to transfer a control signal generated in the control device to the lighting apparatus.

13. The lighting system of claim 12, wherein the conductive attachment part transfers at least one of a dimming signal and a digital multiplex (DMX) signal generated in the control device to the lighting apparatus.

14. A lighting system comprising:
a first conductive attachment part provided at an installation surface and electrically connected with a first terminal of a power source;
a second conductive attachment part provided at the installation surface, spaced from the first conductive attachment part, and electrically connected with a second terminal of the power source; and
a lighting apparatus installed on the installation surface, the lighting apparatus comprising:
a lighting part having a board on which at least one light emitting element is mounted; and a housing part to accommodate the lighting part, the housing part comprising:
a first insulating plate provided in a lengthwise direction of the housing part;
a second insulating plate provided in the lengthwise direction of the housing part, and intersecting the first insulating plate; and
first to fourth housing parts defined by and disposed between the first and second insulating plates to be electrically insulated by the first and second insulating plates, and
two of the first to fourth housing parts, on which the board is seated, are attached to the first and second conductive attachment parts, respectively, and electrically connected with the board.

15. The lighting system of claim 14, further comprising an insertion groove provided at the installation surface so that a part or a whole of the lighting apparatus is inserted therein,
wherein the first and second conductive attachment parts are provided in the insertion groove.

16. Alighting system comprising:
magnetic body provided on an installation surface; and
a first coil provided at the magnetic body and electrically connected with a power source; and
a lighting apparatus installed on the installation surface, the lighting apparatus comprising:
a lighting part;
a second coil coupled with the first coil through an electromagnetic inductive coupling, and configured to receive power of the power source through the electromagnetic inductive coupling; and
a housing part to accommodate the lighting part, the housing part comprising:
a first housing part formed of a conductive material, and electrically connected with the lighting part;
a second housing part formed of the conductive material, and electrically connected with the lighting part; and
an insulation part disposed between the first and second housing parts to insulate the first and second housing part from each other.

17. The lighting system of claim 16, wherein the first housing part and second housing part are attached to the installation surface by an adhering member; and
the second coil is provided in the housing part and electrically connected with the lighting part.

* * * * *